United States Patent [19]

Enander

[11] 4,437,497
[45] Mar. 20, 1984

[54] ULTRASONIC CONTROL OF FILLING A CONTAINER

[76] Inventor: Frederick A. Enander, 28 Sycamore La., Fair Haven, N.J. 07701

[21] Appl. No.: 305,002

[22] Filed: Sep. 23, 1981

[51] Int. Cl.³ .................. B65B 1/30; B65B 3/22
[52] U.S. Cl. .......................... 141/1; 137/386; 141/5; 141/70; 141/198
[58] Field of Search ............ 73/290 V; 137/386; 141/1, 83, 94–96, 100, 128, 157, 159, 180, 198, 237, 392, 70, 5

[56] References Cited

U.S. PATENT DOCUMENTS

| | | | |
|---|---|---|---|
| 2,467,684 | 4/1949 | Meyer et al. | 141/39 |
| 2,548,222 | 4/1951 | Kindseth | 310/306 |
| 2,775,748 | 12/1956 | Rod et al. | 73/290 V |
| 2,960,678 | 11/1960 | Beard et al. | 73/290 V |
| 2,990,543 | 6/1961 | Rod | 340/621 |
| 3,010,318 | 11/1961 | Morgan | 73/290 V |
| 3,019,650 | 2/1962 | Worswick | 73/290 V |
| 3,184,969 | 5/1965 | Bolton | 73/290 V |
| 3,213,438 | 10/1965 | Felice et al. | 340/621 |
| 3,214,974 | 11/1965 | Altman et al. | 73/290 V |
| 3,220,258 | 11/1965 | Rod | 73/290 V |
| 3,220,261 | 11/1965 | Kriebel | 73/432 PS |
| 3,223,964 | 12/1965 | Stadlin | 367/96 |
| 3,241,368 | 3/1966 | Newitt | 73/290 B |
| 3,267,287 | 8/1966 | Berthelsen | 250/222.1 |
| 3,385,328 | 5/1968 | Riesenberg | 141/128 X |
| 3,391,547 | 7/1968 | Kingston | 62/218 |
| 3,404,282 | 10/1968 | Walker | 250/222.1 |
| 3,486,377 | 12/1969 | Franchi | 73/290 R |
| 3,520,186 | 7/1970 | Adams et al. | 73/290 R |
| 3,536,925 | 10/1970 | Schmidt | 250/564 |
| 3,540,275 | 11/1970 | Post et al. | 73/290 V |
| 3,553,636 | 1/1971 | Baird | 367/96 |
| 3,589,196 | 6/1971 | Van Dyck et al. | 73/703 |
| 3,603,149 | 9/1971 | McKown | 73/290 V |
| 3,625,058 | 12/1971 | Endress et al. | 73/290 V |
| 3,626,998 | 12/1971 | Trusselle | 141/198 |
| 3,693,445 | 9/1972 | Johnson | 73/290 V |
| 3,702,625 | 11/1972 | Schmidt | 141/1 |
| 3,825,025 | 7/1974 | Samuel et al. | 137/392 |
| 3,905,404 | 9/1975 | Cox | 141/46 |
| 3,910,116 | 10/1975 | Smith | 73/290 V |
| 3,918,475 | 11/1975 | Trusselle | 141/128 |
| 3,927,569 | 12/1975 | Bergdahl et al. | 73/290 V |
| 3,985,030 | 10/1976 | Charlton | 73/290 V |
| 4,000,650 | 1/1977 | Snyder | 73/290 V |
| 4,083,389 | 4/1978 | Rosen | 141/180 X |
| 4,121,094 | 10/1978 | DiVito et al. | 377/24 |
| 4,145,914 | 3/1979 | Newman | 73/290 V |
| 4,170,765 | 10/1979 | Austin et al. | 367/97 |
| 4,202,049 | 5/1980 | Wetzel | 367/96 |
| 4,221,004 | 9/1980 | Combs et al. | 367/114 |
| 4,248,087 | 2/1981 | Dennis et al. | 73/290 V |
| 4,261,397 | 4/1981 | Guy | 141/1 |

FOREIGN PATENT DOCUMENTS

| | | |
|---|---|---|
| 2649075 | 12/1977 | Fed. Rep. of Germany . |
| 1514156 | 1/1968 | France . |
| 2008057 | 5/1979 | United Kingdom . |
| 1587617 | 4/1981 | United Kingdom . |

Primary Examiner—Charles E. Phillips
Assistant Examiner—Mark Thronson
Attorney, Agent, or Firm—Kenyon & Kenyon

[57] ABSTRACT

A system for filling containers with liquid and the like which reflects ultrasonic pulses from the surface of the liquid as it rises in the container being filled. Range gates at predetermined fill levels control throttling down and/or shut off of the filling liquid.

23 Claims, 7 Drawing Figures

ULTRASONIC CONTROL OF FILLING A CONTAINER

BACKGROUND OF THE INVENTION

1. Field of the Invention

This invention relates to apparatus for controlling the filling of a container by ultrasonic sound waves. More particularly, the invention relates to new and improved methods and apparatus for providing a cut-off signal for closing a fill valve when the level of liquid material or the like being delivered to a container has reached a predetermined level in the container can.

2. Description of the Prior Art

Ultrasonic pulse echo ranging systems for monitoring the depth of liquid in tanks are known. In one such system, a transducer, located in the bottom of the tank, directs pulsed energy upwardly. The depth of liquid is determined by measuring the time required for the ultrasonic energy to be transmitted to and then reflected by the surface of the liquid in the tank.

In another system, the level of sludge in a reservoir is measured by transmitting 80 microsecond pulses of ultrasonic energy at 200 kHz every 1½ seconds from a point beneath the surface of the fluid in a reservoir adjacent the bottom. To exclude response to stray particulate matter suspended in the liquid above the level of the sludge, this system utilizes four consecutive outputs of the echo signal to trigger a control signal.

In still another system, a variable width gate provides a time "window" during which a pulse system is gated open to receive an echo pulse in an ultrasonic system for measuring the distance from a transducer to both the surface of a liquid and the bottom of a channel through which the liquid is flowing.

While the above prior art systems are generally effective for measuring liquid level in large bodies of fluid having substantial sonic travel times, attempts to use them for measuring liquid levels in containers over a short distance have generally been ineffective due to insufficient short range capability and the inability to resolve the small distances needed for accurate filling as well as due to inability to withstand ambient noise conditions. Thus, it is necessary for the measuring ultrasonic beam from the transducer to enter the mouth of the can alongside of the fill spout. Sound reflected from the liquid surface inside of the can must then travel back to the transducer. The sound waves can be interfered with by foaming of the liquid on the surface when filling is done at a high rate. In addition, false echoes from the bottom of the can can produce false readings which can result in premature shut-down of the filling operation.

It is known in the art of filling systems to use a light beam transmitted at an angle to the surface of the liquid. When the beam was reflected from a surface at the desired level, it impinges on a photocell and generates a control signal. This system may be adversely affected by the reflecting property of the material being filled such as with dark paints and transparent varnishes.

It is an object of the present invention to provide an apparatus utilizing ultrasonic energy for accurately determining the level of a fluid in containers as small as ¼ pint in capacity and even smaller as the container is filled at a high rate, and for providing controlled shut-off of the flow of liquid into the container.

It is another object of the invention to use echo ranging of ultrasonic energy to control a filling operation.

It is also an object of the invention to measure a liquid level in a container during a filling operation by the use of pulsed ultrasonic energy.

It is a further object of the invention to provide a plurality of echo ranging measurements of ultrasonic energy reflected by a liquid level during a filling operation.

SUMMARY OF THE INVENTION

The above objects are met in the present invention by means of an ultrasonic transducer which is mounted above a container into which a liquid, such as paint, is being fed via a fill tube and a fill valve. Repeated bursts of ultrasonic energy are directed downward past the tube into the container as it is being filled. Energy reflected from the rising surface of the liquid in the container is returned in bursts to the transducer and the transit time between transmission of a burst and reception of a corresponding return burst provides the basis for measurement of the distance between the transducer and the surface of the liquid. In one embodiment of the invention, both the spout and the transducer are mounted together and can be moved as a unit up and down above the container fill position. In this way, the level of the liquid can be set easily when changing from one container size to another. The use of one megacycle ultrasonic bursts having a duration of aproximately one microsecond results in high accuracy of filling.

An electronic timing system controls the transmission of the bursts or pulses of ultrasonic energy and, by means of a gate which occurs at a predetermined interval after each burst passes those reflected signal bursts which are returned after the predetermined interval to valve control solenoids which stop the flow of liquid to the can at a predetermined level. By means of a second gate, which responds to reflected pulses taking a longer time to return, a control signal fed to the fill valve causes the flow of paint to be throttled down to a lower rate, giving higher accuracy of fill as the point of full shut off of flow is approached. To insure that false echoes, such as those reflected from the surface of the fluid or the bottom of the can at double the predetermined distance, do not enter a gate and cause false triggering of the throttle or the shut-off signals, the time interval between successive transmitted pulses is changed and the received signals, passed through either gate, are fed to a signal memory associated with the gate. At least two successive pulses must pass the respective gate at the correct time before a throttle or shut-down control signal is passed to the throttle and shut-down solenoids on the fill control valve.

Another feature of the invention provides, during filling each container, for clearance of bubbles from the surface of the liquid on which the sound bursts impinge by means of an air jet to provide a clearly established transition for reflected pulses.

According to still another feature of the invention, the ultrasonic probe first described forms part of an automated filling apparatus having one or more fill heads beneath which containers are moved on a conveyor belt. A star wheel is associated with each fill station when, for example, there are two fill heads. Each wheel is rotated by a container as it moves towards its place at the associated fill head. The wheels are locked to position the containers beneath the fill heads and to prevent their travel during flow of paint through the fill valve. When filling has been completed, each star wheel is released and, when empty cans are again positioned beneath the fill heads, again locked in place. By sensing the position of each star wheel, operation of the fill valves is prevented when empty cans are not in place.

DETAILED DESCRIPTION OF THE INVENTION

Figure 1:
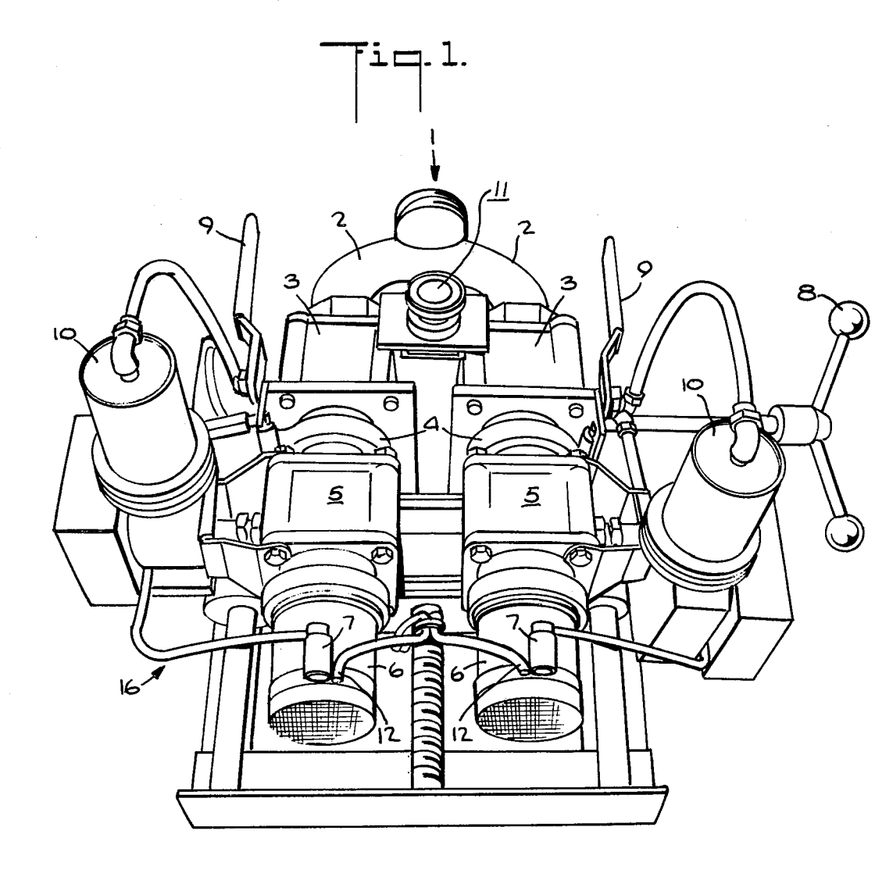
FIG. 1 is a perspective view of a system in accordance with the invention for filling containers with liquid to a predetermined level.

FIG. 1 is a perspective view of an apparatus embodying the teachings of the invention as applied to a production station for simultaneously filling two paint cans. In this embodiment, paint flowing through feed line 1 is split into two branch lines 2 where it passes through a manual shut-off valve 3 in each line and thence through quick connect clamps 4 into stainless steel ball valves 5. From ball valves 5, paint flows through and out of fill tubes 6 to flow into two cans, placed side by side, which are not shown. Each fill tube in each fill head carries with it an ultrasonic sensor 7 and the assembly is vertically adjustable by means of, for example, a rack and pinion (See FIG. 2) which is operated by hand wheel 8. Manual shut-off valves 3 can be closed by means of levers 9. Ball valves 5 are operated by pneumatic actuators 10. Emergency stop 11 is provided for quick actuation of the pneumatic system to close off flow of paint during an emergency period. Air jet tubes 12, each carried on the side of a fill tube 6, are directed downwards into the container alongside of paint flowing from the associated fill tube. Air is supplied to each jet tube during filling to sweep bubbles or vapors from the surface of the liquid as it fills the container to allow the surface to be directly sensed by ultrasonic probe 7. This prevents any accumulation of bubbles and the like at the interface between the air and liquid from blurring the reflection of sound by the surface of the fluid and thus provides a more accurate reading of the surface position.

Figure 2:
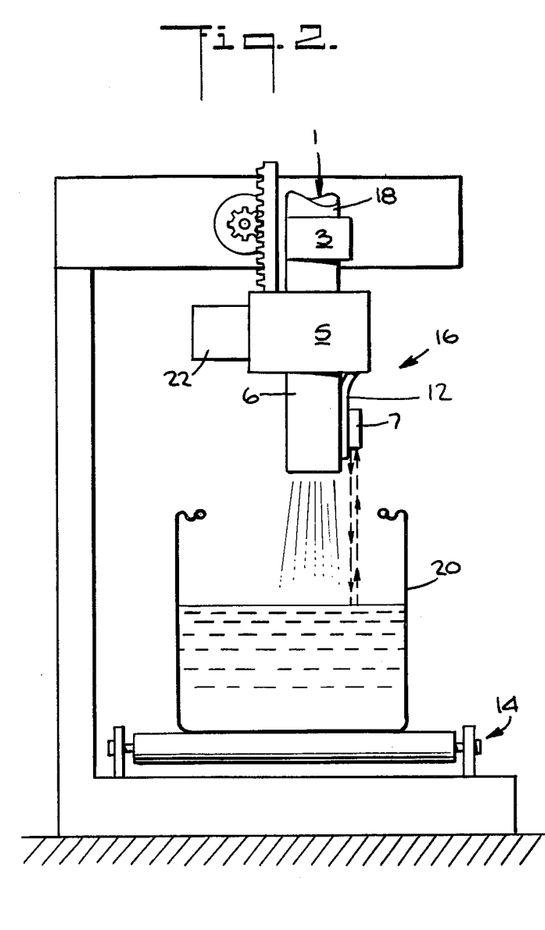
FIG. 2 is a schematic view of the filling head used in the embodiment of the invention shown in FIG. 1.

FIG. 2 shows a schematic view of a single fill head of the type used in the assembly of FIG. 1. Here, a single paint can 20 has been moved on conveyor 14 into position beneath vertically adjustable filling head assembly 16. Paint 1, flowing from a supply tank, not shown, flows into the top of the filling head assembly via flexible conduit 18 through manual shut-off valve 3 to air actuated ball valve 5. Fill tube 6, attached to the outlet of ball valve 5, directs the paint downward into a container 20 which is to be filled. Ultrasonic transducer 6 is fastened to spout 18 and travels with valve head assembly 16 when it is adjusted vertically.

Ball type dispensing valve 5 is coupled to air cylinder 22, the operation of which will be explained in greater detail in connection with FIG. 3.

Figure 6:
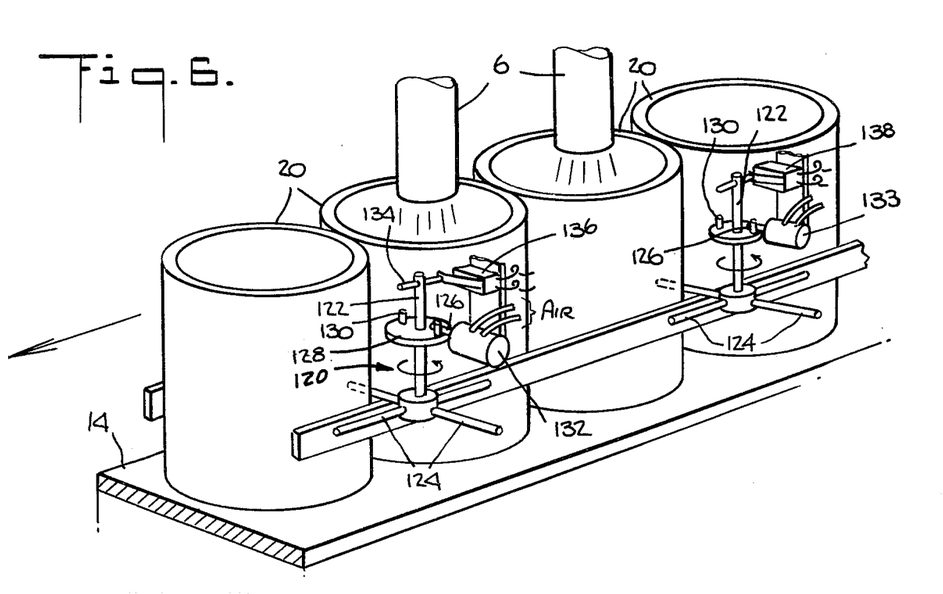
FIG. 6 is a schematic diagram showing the relationship between a fill conveyor, a plurality of containers being moved on the conveyor, and two star wheels for controlling the filling operation.

A system of star wheels 120, shown in its relationship to a conveyor 14 and used with a system for simultaneously filling two containers carried on the conveyor, is shown in FIG. 6. By means of the star wheels, operation of ball valve 5 by air cylinder 22, as will be explained in connection with FIG. 3, is prevented unless a container is properly positioned beneath the fill tube.

Figure 3:
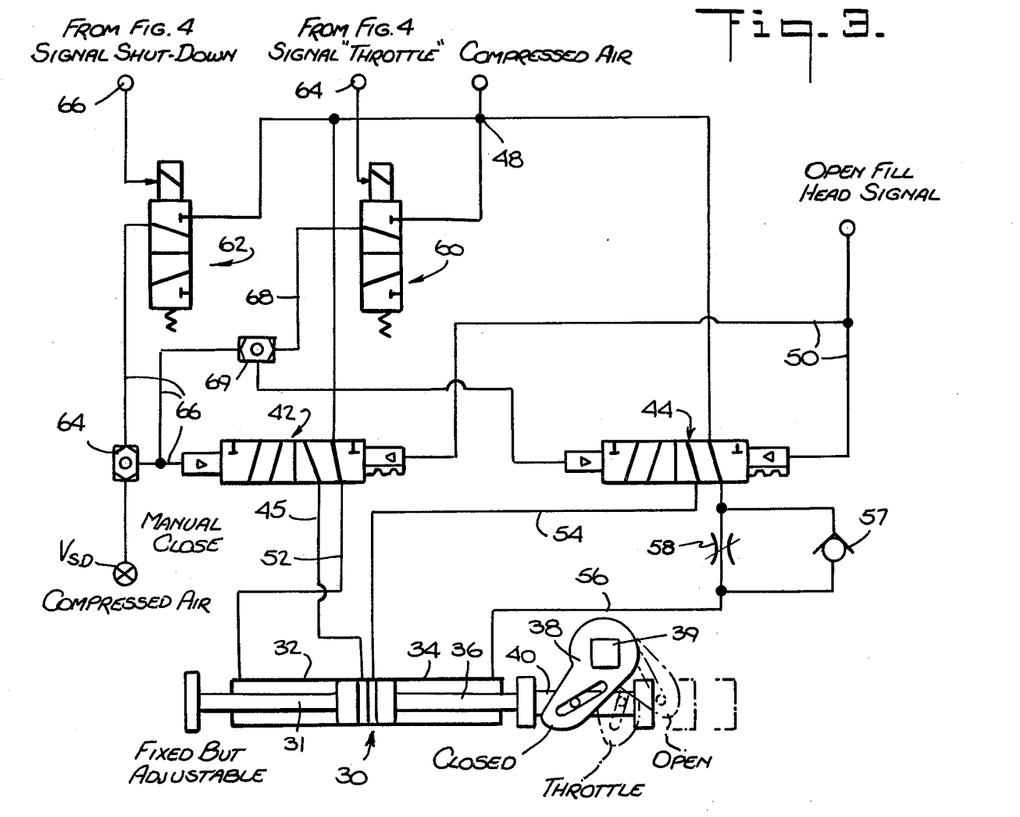
FIG. 3 is a schematic diagram of the pneumatic paint fill control system of the invention.
Figure 7:
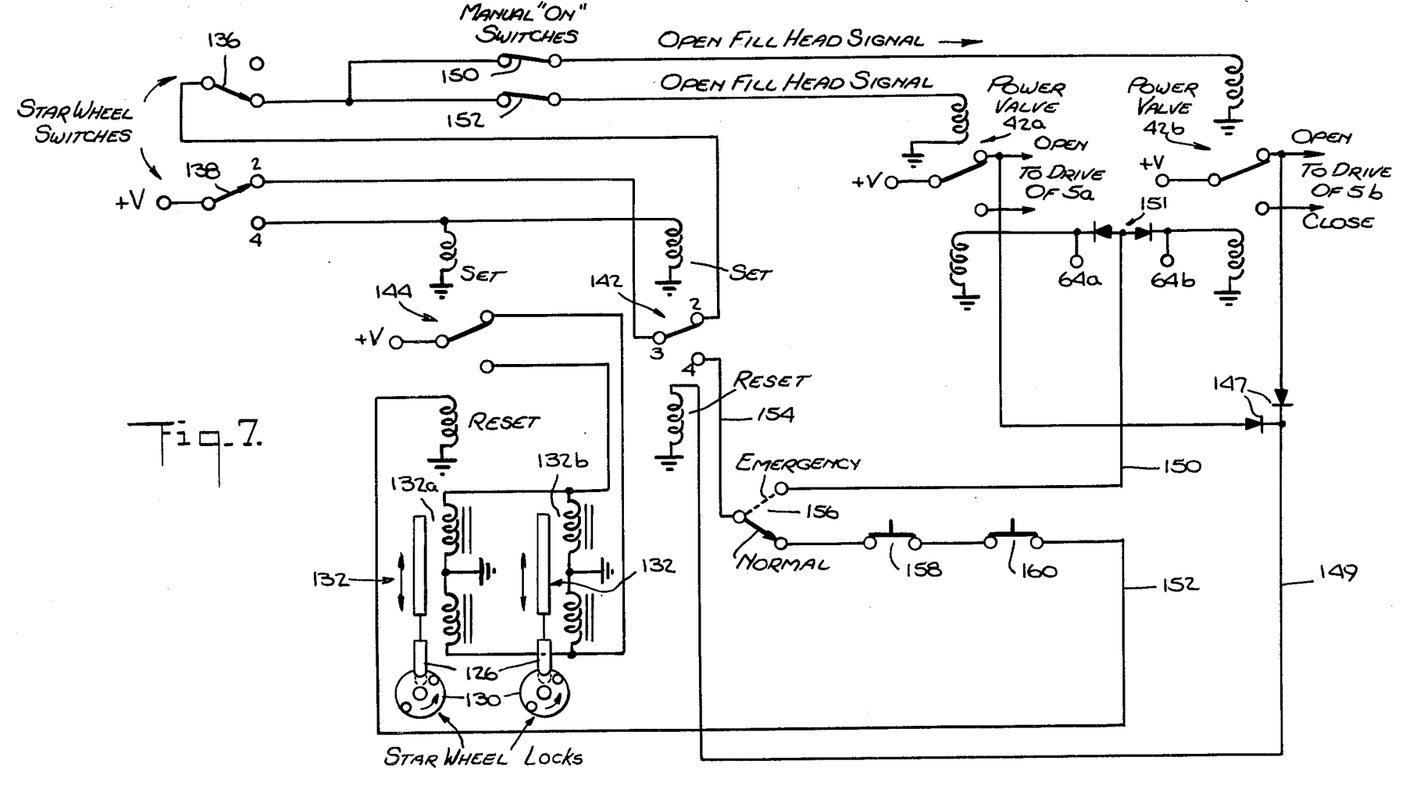
FIG. 7 is a schematic electrical representation of the pneumatic star wheel control apparatus of the invention.

FIG. 3 is a schematic diagram showing an electro-pneumatic circuit for operating one fill valve 5 of FIGS. 1 and 2. It will be understood that a duplicate circuit is used for controlling a second fill head when two are used as shown in FIGS. 1 and 7. Fill valve 5 is a ball valve and is driven by double acting pneumatic actuator 30 which provides for variable positioning of the globe valve between a fully closed position, a throttle position, and a fully open position. Fill valve 5 is coupled to variable position valve actuator 30 by means of cam 38 which rides back and forth in slotted part or yoke 40 of throttle drive piston 36 and turns valve stem 39 of ball valve 5 (not shown). Variable position valve actuator 30 has two drive pistons carried in back-to-back relation fill and throttle drive cylinders 32 and 34. Throttle drive piston 36 moves backwards and forwards in throttle actuator cylinder 34. Fill drive piston 31 can move the length of fill drive cyliner 32. The free end of the connecting rod of piston 31 is adjustably anchored to the frame (not shown) of the apparatus to permit variation of the starting fill rate. The back-to-back assembly of drive cylinders 32 and 34 is slidably mounted on the frame and is free to move to and fro relative to shut-off drive piston 31. It will be understood that both pistons are double acting, e.g. the application of air to either side of the piston head will apply a force thereto and cause motion of the piston relative to the drive cylinders. As illustrated in FIG. 3, air can be supplied to fill drive cylinder 32 via air actuated fill power valve 42 and to throttle drive cylinder 34 via throttle power valve 44. These valves may be four way, five ported, double pilot, detented pneumatic relays. When the drive pistons are located in drive cylinders 32 and 34 at the position shown in FIG. 3, air supplied from fill power valve 42 on line 45 will cause the cylinder 32 and cylinder 34 to move to the right, moving cam 38 45° to position the ball valve at about 5% open. This position is represented in FIG. 3 by the position of the cam shown in dashes and marked "THROTTLE." An "open fill head" control signal for opening the valve is generated by the star wheel apparatus shown in FIG. 7. It will be understood that other switch means activated when a can is in place may be used to supply the "open fill head" signal. As shown in FIG. 3, the "open fill head" signal is an air signal which is transmitted via lines 50 to actuate fill power valve 42 and throttle power valve 44. Actuation of these valves supplies air via line 45 to fill drive cylinder 32 and via line 54 to throttle drive cylinder 34. Since fill drive cylinder connecting line 52 is vented to the atmosphere by the actuation of fill power valve 42, both valve actuator cylinders 32 and 34 move rapidly to the right, setting cam 38 at the THROTTLE position and thus opening ball valve 5 part way. At the same time, escaping air from throttle drive cylinder 34 is let out through line 56, bleed valve 58, and the vent of throttle power valve 44.

By means of throttle bleed valve 58, the shifting of cam 38 to OPEN position (FIG. 3) can be set by the operator to a gradual rate which avoids the generation of foaming and splashing on the bare bottom of the can. When there is sufficient coverage of the bottom of the can, the operator can thus arrange for the valve to arrive at the fully open position.

Once opened, ball valve 5 can be returned to the THROTTLE position or to the fully CLOSED position by variable position valve actuator 30 as follows. Valve 5 may be returned to the THROTTLE position by applying an appropriate voltage to input lead 64 on solenoid control valve 60. Such a voltage is provided by the throttle gating circuit of FIG. 4. When this is done, compressed air from line 48 is supplied via shuttle valve 69 to throttle power valve 44. The spool in valve 44 shifts and applies air through line 56 and check valve 57 to throttle drive cylinder 34. The check valve allows air to flow freely past bleed valve 58 in this direction. At the same time air is allowed to exit via line 54 from the opposite side of piston 36. Piston 36 therefore travels to the left, bringing cam 38 to the THROTTLE position from the OPEN position.

Figure 4:
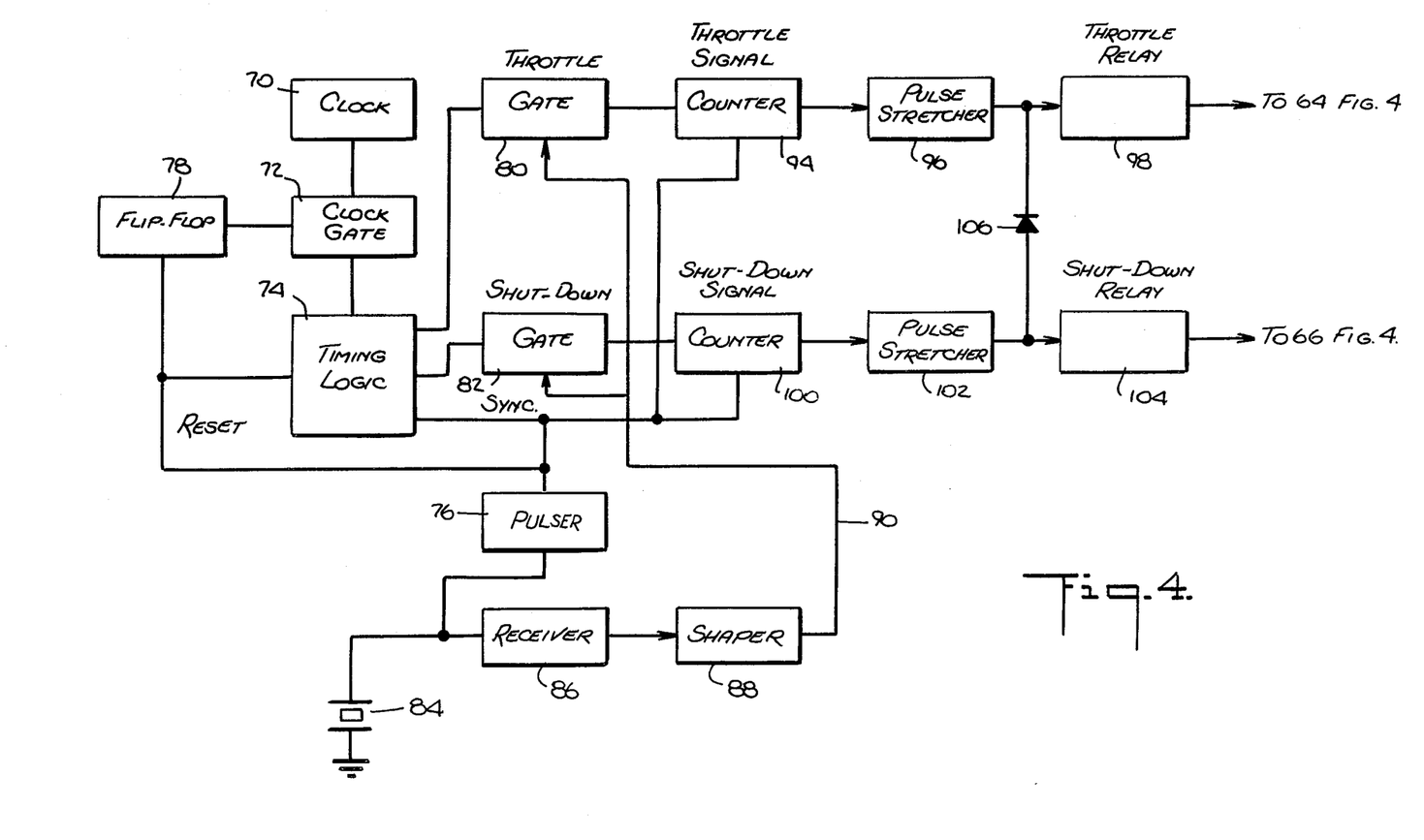
FIG. 4 is a block diagram showing the electronic control system which actuates the pneumatic fill control system.

Shut down of flow of paint through valve 5 can be brought about by supplying a signal from the circuit of FIG. 4 to input lead 66 of shut down solenoid valve 62. This applies air from compressed air supply line 48 via shuttle valve 64 on line 66 to fill power valve 42. At the same time, as a safety measure, air is passed to throttle valve 69 and thence to throttle power valve 44 to make sure that, if it has not been previously done, throttle power valve 44 is now actuated (in the manner described above) as part of the shut down process. The application of air to shut down power valve 42 reverses the position of the valve, applying air to line 52 from the compressed air supply and venting air via line 45, forcing the back to back cylinder assembly 32 and 34 to the left, and moving cam 38 to the CLOSED position. This same result can be achieved, for example, in an emergency, by hand actuated manual close valve $V_{SD}$. By use of this valve, air is admitted via shuttle valve 64 to lines 66 and the process just described occurs.

A circuit for providing control signals to throttle solenoid input terminal 64 and shut-down signal solenoid 66 is shown in FIG. 4. The timing relationship between the various input and output signals is shown in FIG. 5.

The electronic system by means of which a pulsed signal is supplied to the transducer 7 associated with a fill head and by means of which signals reflected from the liquid within a container being filled are returned and caused to throttle and shut-down a variable position fill valve 5 is shown in FIG. 4. The system provides accurate measurement of fluid height as well as accurate THROTTLE and SHUT-DOWN signals for precisely controlling the filling of a container. For this purpose the time taken by a pulse transmitted from the transducer to reach the surface of the liquid when it is at the desired level and to return is predetermined for both the point at which flow is to be throttled and the point at which flow is to be shut-down. Given these values, the system generates timed range gate signals which are applied to a shut-down gate and a throttle down gate connected to the output of a receiver through which the return pulses are passed. When an echo is received, for example, from a rising paint surface at the distance at which throttle action is needed, the transmitted pulse, reflected from the paint, arrives at the receiver output at the time when the throttle gate is open; the signal is passed through. This also occurs at a later time when the paint has risen to the shut-off level; the return pulse then coincides with the shut-down gate and is passed through.

Among the features of the system is provision for distinguishing between true reflections from the paint surface and false reflections or echoes from the bottom of the can at double the distance to the predetermined level. In order to provide a high resolution system capable of operating in the small space which, for example, a ¼ pint can provides, it is necessary to utilize extremely short ultrasonic pulses on the order of one microsecond in length and, at the same time, to focus the pulses as narrowly as possible on the surface of the paint in the can. When a one megaHerz ultrasound burst having a one microsecond duration is used, the system can respond to liquid levels as little as one and one third inches away. A problem arises however, with echoes which are returned when the bottom of the can is at a distance away from the probe equal to double the distances to the predetermined fill or to the predetermined throttle levels. Thus, it is possible for a pulse from the bottom to enter the range gate and to be mistaken for a pulse from the surface of the liquid. Such a pulse can cause the system to be shut down prematurely.

Figure 5:
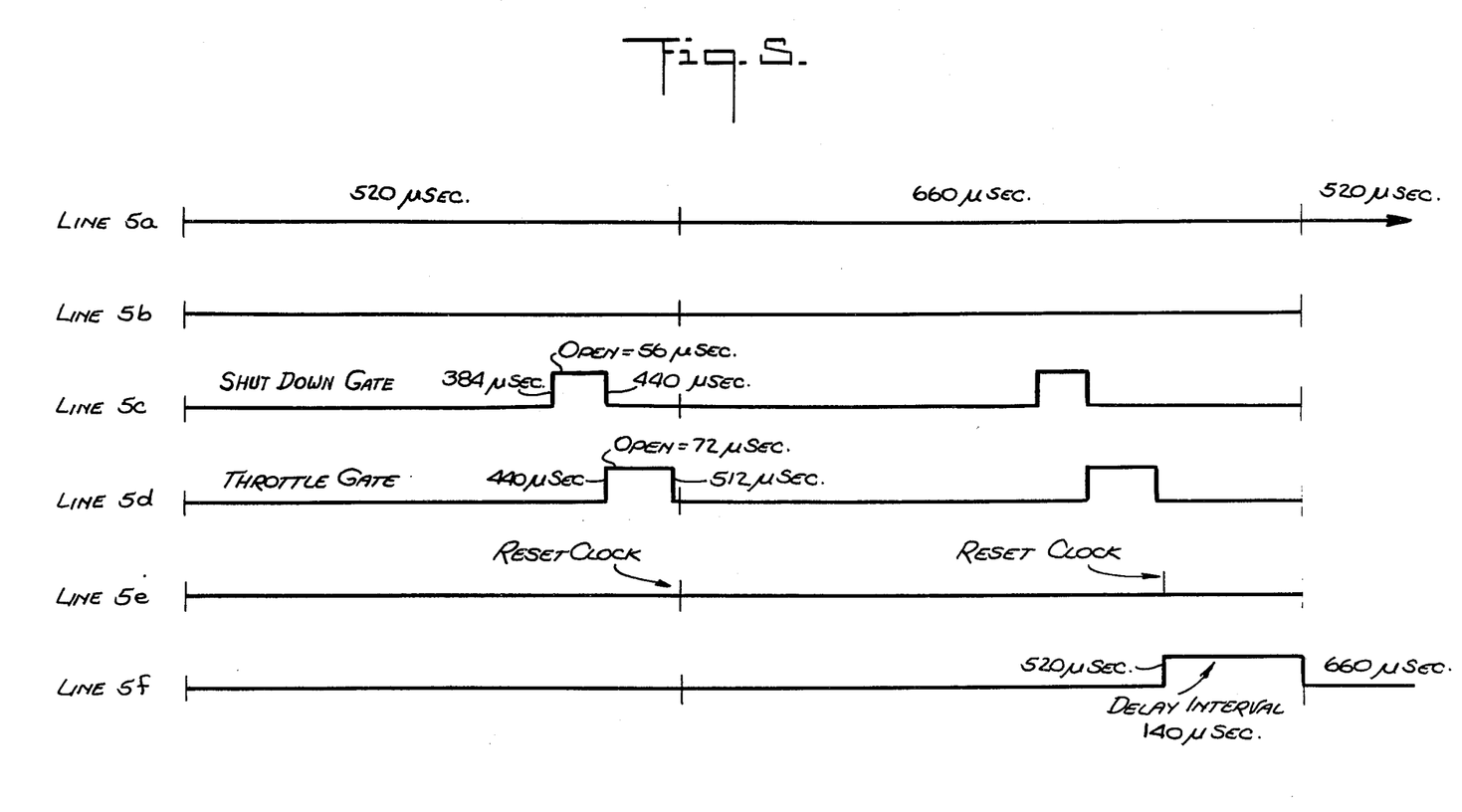
FIG. 5 is a timing diagram showing the relationship between the transmitted pulses, the received pulses, and the valve control signals.

To eliminate the effect of false echoes, the time base of the system is varied between successive synchronizing pulses as shown in timing diagram line 5a of FIG. 5. As shown in line 5b, the pulser of the system causes the transducer to transmit a pulse or burst of ultrasonic energy when it receives each synchronizing pulse. A time of 520 microseconds elapses, before a second synchronizing signal, shown in line 5a, is generated. (The synchronizing pulse spacings are based on the clock-related reset signal shown on line 5e which is used to reset the timing logic and to start another timing cycle. The pulser is again fired, but this time the basic period between that pulse and the next succeeding pulse is made equal to 660 microseconds. This is brought about by use of the reset signal to activate a flip-flop to produce the time interval shown in line 5f as a 140 microsecond, positive pulse.

Referring now to FIG. 4, it will be seen that the basic timing signals are provided by means of a crystal controlled clock 70 which generates clock pulses at a rate of 2.01 mHz. The output of clock 70 is coupled through clock gate 72 to the input of timing logic 74. Timing logic 74 may consist of a fourteen stage ripple counter having plural outputs which are NAND gated to give a number of outputs signals having particular timed relationships. The basic clock rate produces a series of reset pulses, (FIG. 5e) spaced 520 microseconds apart, which are coupled to pulser 76 and to monostable multivibrator or flip flop 78. Two gating voltages, e.g., a throttle gate voltage which is fed to throttle gate 80 and a shut down gate voltage which is fed to shut down gate 82, are also provided. (See FIGS. 5c and 5d). The leading edge and the trailing edge of the shut down gate occur 384 microseconds and 440 microseconds, respectively, after a particular timing period has been started. Similarly, the leading edge and the trailing edge of the throttle gate occur at 440 and 512 microseconds, respectively, after the start of the same timing period. As mentioned above, the repetition rate of the ultrasonic bursts is about 2000 pps and the interval between successive pulses transmitted by pulser 76 to ultrasonic transducer 84 is varied so that false echoes, particularly false echoes from the bottom of the container, can be discriminated against. For this purpose, two time base intervals, arbitrarily chosen as 520 microseconds and 660 microseconds, are used. In the illustrative embodiment, this varied timing is brought about by having a first timing interval of 520 microseconds which is extended 140 microseconds by means of flip-flop 78 to produce a second timing interval of 660 microseconds. To activate flip flop 78, the reset signal from timing logic 74 is fed to monostable flip-flop 78. Flip-flop 78 then generates a signal which is 140 microseconds in length and which is coupled to clock gate 72 and cuts off the input of clock pulses to timing logic 74. At the end of 140 microseconds, clock gate 72 is opened again and clock pulses are again transmitted to timing logic 74 which then resumes generation of pulses and gates.

Ultrasonic transducer 84 is made of barium titanate and resonates at 1 megacycle when driven by pulser 76. It may be of the type known in the trade as a "paint board" transducer manufactured by Harisonic Laboratories, Inc. The transducer emits a 1 microsecond pulse of energy at a frequency of one megaHerz; e.g. about one cycle of ultrasonic energy. The transmitted energy is reflected to the transducer from inside the can and is picked up by the transducer and passed into receiver 86 where it is amplified and then into pulse shaper 88 where the length and amplitude of the pulse are enhanced for application, via connecting line 90, to separate inputs of throttle gate 80 and shut down gate 82. Receiver 86 has a wide pass band to amplify the one megacycle received signal without degradation. The receiver is also designed to have a recovery time of about 200 microseconds so that spurious early echos from metallic surfaces surrounding the transducer and from the can are effectively suppressed. The receiver thus can pass signals reflected from objects about one and one half inches away from the transducer.

When a can is being filled, signals reflected from the rising surface of liquid within the can which have a transit time of 512 microseconds will eventually be returned and will pass through throttle gate 80, to which they are supplied on connecting line 90. When such echo pulses are passed through gate 80 to counter 94, which serves as a signal memory, a throttle control pulse signal is passed to pulse stretcher 96 where the pulse length is extended to 200 milliseconds for operating throttle relay 98. When a pulse is supplied to throttle relay 98, it closes and transmits a voltage to terminal 64 of throttle solenoid valve 60, actuating that valve as described above. Counter 94, which may be a 4-bit static shift register whose outputs are coupled to, for example, a two or three input NAND gate, insures that all of the echo pulses received are valid pulses. Counter 94, it will be noted, is shown in FIG. 4 as having a clock input to which the synchronizing pulses are fed. Thus, each time that a first pulse and a delayed comparison pulse have been transmitted, the counter is cleared and a new series of received echo pulses must be transmitted to it by the throttle gate.

Because of the forced variation in the time base, successive false echoes from the bottom will be received at different times and successive false echo pulses will therefore not be registered in the counter. The same is true, for example, if splashes of liquid in the can produce echoes. Only when successive pulses reflected from the surface of the filling paint are received will it be possible for a signal to be transmitted from the counter to the pulse stretcher.

The same components are used in constructing shutdown gate 82. Gate 82 has pulses from the receiver at one input on line 90 and provides output pulses to shutdown signal counter 100. The same process of counting and NANDing is followed in counter 100, with the result that only true reflected pulses will produce an input pulse to pulse stretcher 102 for transmission to shut-down relay 104. It is a feature of the invention that the output of shut-down gate pulse stretcher 102 is coupled via diode 106 to the input of throttle relay 98 to insure that, when shut down is desired, the throttle solenoid has been activated to shift the variable position valve actuator 30 to the throttle position. In this way full closing of ball valve 5 is insured.

FIG. 6 shows two star wheels 120 placed alongside conveyor 14 which are used to control motion of a series of containers 20 beneath a pair of fill tubes 6 to insure that the containers are in place before fill valves 5a and 5b are opened. The star wheels also block the containers in place during filling and release the containers when they are filled.

Each star wheel 120 has a vertical shaft 122 which is rotatably mounted in journals, not shown. The lower end of each shaft is provided with four radially extending arms 124 which are equally spaced 90° apart from each other. Arms 124 are rigidly fashioned to vertical shaft 122. Each vertical shaft 122 is blocked against rotation by the engagement of a star wheel locking pin 126 on one of two stop pins 130 carried on a cam plate 128. Star wheel locking pins 126 are movable radially into and out of engagement with stop pins 130 by means of pistons in air drive cylinders 132 and 133. The position of each star wheel 120 is detected by means of cams 134 carried on rotating shaft 122. Cam pins 134 are spaced 180° apart, on either side of the shaft, and signal, by closing a switch 136 or 138, when either of two opposing arms 124 of the associated star wheel is positioned so that two empty cans are in place beneath the fill heads.

The star wheel system used to control the apparatus is a passive one and depends on motive power applied to conveyor belt 14 for its operation. As shown, conveyor belt 14 urges containers 20 into engagement with a projecting arm 124 of each star wheel. When rotation of the star wheel is stopped by movement of the star wheel locking pin 126 into the path of a stop pin 130, a container 20 is positioned correctly beneath a fill head 6. When each star wheel 124 is thus positioned cams, 134 close contacts on star wheel switches 136 and 138, respectively, indicating that new cans have been placed beneath the fill heads. Since each 90° movement of the star wheel results from passage of a container past that wheel, two containers must have been moved past each star wheel, resulting in a 180° turn of each star wheel which is reported by the closing of the switches and insures that two cans have passed each wheel. This arrangement has particular advantages when used in explosive environments if, instead of the electric switch contacts shown at 136 and 138, pneumatic switches are used with pneumatic control circuitry of the type shown in FIG. 3 above.

FIG. 7 shows a circuit for use in controlling the fill operation of an automatic paint can filling apparatus using the star wheel control system of FIG. 6. The circuit can be implemented electrically, as shown, or it can be implemented pneumatically using known equivalent pneumatic parts. As indicated above, if the system and apparatus of the invention is to be used in an atmosphere in which combustible or explosive vapors are present, then the strucure of FIG. 7 is preferably realized using pneumatic components. The implementation of the control circuitry has been set forth in electrical form instead of pneumatic in order to simplify the presentation of the invention. Only the circuits necessary for regulating fill and shut off operations of two fill valves are shown.

Star wheel switches 136 and 138 are shown in FIG. 7 in the closed position which they occupy after the passage of two containers past each wheel. Prior to this time, when star switch 138 was in its up, or open position, voltage from source V will have been applied to the "set" coils of latching type fill relay 142 and latching type wheel lock relay 144. When star wheel lock relay 144 is thus set, as shown, voltage from source V is applied to solenoid coils 132a and 132b of each locking pin actuator 132. Locking pins 126 therefore advance into position to engage cam pins 130 on both star wheels. When travel of the star wheels moves the cams to the desired position, then the wheels will be locked and the star wheel switches will transfer. Power can now flow from the pin of switch 136 to its contact and thence through manual "on" switches 150 and 152 to provide the "open fill head" signal to the "open" solenoids of power valves 42a and 42b of ball valves 5a and 5b, respectively. The power for energizing these solenoids is supplied from source V, via star wheel switch 138, which is now in the closed (up) position, and via the switch arm of fill relay 142, previously raised to its present position by the "set" signal, to the switch arm of star wheel 136. The application of power to power star valves 42a and 42b switches these valves to the "open" position causing the voltage V to be applied to the drives of valves 5a and 5b. This is the equivalent of supplying air pressure to variable position valve operation cylinder 32 from pneumatic power valve 42 to open ball valve 5 as shown in FIG. 3.

Switches 150 and 152, it will be understood, are closed when both fill stations are to be used. If either one is not required, the appropriate switch is opened.

The application of power to the OPEN outputs of power vaves 42a and 42b also supplies voltage, via back-to-back diodes 147 (the electrical equivalent of shuttle valve 64 of FIG. 3) and thence via line 149 to the reset solenoid of fill relay 142. This cuts off power to the "OPEN" solenoids of power valves 42a and 42b and supplies power to interlock or safety switch line 154. Interlock line 154 is connected to double throw emergency switch 156. When switch 156 is in the normal position, power is transmitted via fill valve indicator switches 158 and 160 to the reset coils of star wheel cam actuators 132 and pins 126 are withdrawn from star wheel cams 130, allowing the star wheels to rotate. Fill valve indicator switches 158 and 160 are coupled to the fill valves (not shown) and are only closed when the fill valves are closed. This assures that the fill valves are closed before the star wheels (and the paint containers) are released.

When the pin of emergency switch 156 is moved to the position shown in dashed lines in FIG. 7, voltage from the fill relay is fed via back-to-back diodes 151 to the "close" solenoids of power valves 42a and 42b.

Automatic shut-down of the system is accomplished as follows. A shut-down signal, derived from one of two duplicate circuits like that of FIG. 4 and responding to ultrasonic signals from one of two transducers attached to each fill head is applied to either input terminal 64a or 64b. Terminals 64a and 64b are each connected to a "CLOSE" solenoid of power valve 42a or 42b, respectively. This switches the supply voltage V to the "CLOSE" output of the respective power valve and causes the drive for the associated ball valve to close as set forth above in connection with FIGS. 3 and 4. Shut down of the two fill valves 5a and 5b is thus accomplished independently by signals from the individual transducers. Reset of wheel lock relay 144, however, is delayed until both fill valve indicator switches show that the valves are closed. When indicator switches 158 and 160 are closed, power is supplied to reset lock relay 144 and to cause withdrawal of the pins, allowing the star wheels to rotate. The cycle then repeats itself.

As will be understood by those skilled in the art, the electrical components set forth above have well known pneumatic equivalents. Relays 142 and 144 may thus be four-way, five ported, two position, detented, air piloted switches. The back-to-back diodes are the equivalent of shuttle 69 of FIG. 3. Star switch 136 and star switch 138 may be a three-way valve, two position and a two position, five port, four-way valve, respectively. The equivalent of the solenoid actuated drives 132 for star wheel stop pins 126 may be double acting air cylinders. Emergency stop switch 156 is like star switch 138, but is detented. A supply of air, under pressure, of course, replaces the voltage V.

The structure of the invention permits the filling of containers varying in size from one quarter pint or less, to a five gallon size, accurately and quickly controlled to an accuracy of about 0.007 inch. With suitable adaptation, the ultrasonic probe of the invention can be used to control the filling of 55 gallon drums. Even during operation, the fill height can be adjusted by the turn of a single handle, since the vertical motion of the fill head and transducer carries the "predetermined" fill and throttle levels to new positions. With the system of the invention, the fill head can be successfully operated at distances from the transducer from as little as about 1½ inches to 9 inches from the desired fill level. The dual set point ultrasonics greatly reduce spash and foaming, thereby improving fill accuracy. This is because the slower initial flow of paint, which is possible at the initial, throttled rate, places a cushion of liquid in the container which prevents splashing and foaming of the product as it hits the bottom of the can. The throttling of the flow just before shut off avoids splashing and foaming at cut off, eliminating mess and permitting product fill accuracies of up to 1/10 of one percent. It also accommodates varying head pressure, so that, in general, the same amount of liquid product will be in the air at each shut off time.

It will be apparent to those skilled in the art that the invention described above has utility in filling containers with substances other than paint and that it can be used, for example, in filling containers with powdered or granular materials of many kinds. The below appended claims should, therefore, be given an interpretation in keeping with the spirit of the invention.

What is claimed is:

1. A method for filling a container or the like with flowable material to a predetermined level using ultrasonic energy comprising the steps of:
holding the container in position to receive the material;
initiating a flow of material into the container;
directing bursts of ultrasonic energy toward the container to be filled from a source disposed adjacent to the container, the bursts being spaced apart at intervals;

activating a sensing means disposed adjacent to the container;

opening a gate at a predetermined delay with respect to a burst of ultrasonic energy, the predetermined delay corresponding to the time required for a burst to travel from the source to the predetermined level and for its echo to return to the sensing means;

sensing the passage of an echo of a burst through the gate when the gate is open, the sensing of the echo being at the time the flowable material has attained the predetermined level; and terminating the flow of material into the container in response to the sensing of the echo of a burst of ultrasonic energy at the predetermined delay.

2. The method of claim 1 in which the bursts of ultrasonic energy being directed toward the container are each shorter in duration than the time required for a burst of energy to travel to the material and for an echo thereof to return when the predetermined level of material is reached.

3. The method in accordance with claim 1 in which the step of initiating a flow of material comprises:

filling the container at a reduced rate at the start and thereafter gradually increasing the rate to a high rate, whereby splashing and sudsing are substantially reduced.

4. The method of claim 1 and further comprising the steps of:

additionally sensing the echo of a burst of ultrasonic energy when another predetermined level of material which is less than the predetermined level is reached; and reducing the flow of material into the container in response to the additional sensing of the echo of a burst of ultrasonic energy when the other predetermined level is reached.

5. The method of claim 1 in which the step of initiating a flow of material comprises:

initiating two separate flows of material with each being directed toward a different container; and further comprising the step of:

sensing the arrival of two containers at a predetermined location for simultaneous filling thereof in which the step of initiating the flow of material into each of the containers is responsive to the sensing of the arrival of the two containers.

6. Apparatus for filling a container or the like with flowable material to a predetermined level using ultrasonic energy comprising:

means for holding the container in position to receive the material;

means for initiating a flow of material into the container;

source means disposed adjacent to the container for directing bursts of ultrasonic energy toward the container to be filled, the bursts being spaced apart at intervals;

echo sensing means disposed adjacent to the container;

a gate which opens at a predetermined delay with respect to a burst of ultrasonic energy, the delay corresponding to the time required for the burst to travel to the predetermined level and for its echo to return to the echo sensing means;

means for sensing the passage of an echo of a burst through the gate when the gate is open, the sensing of the echo being at the time the flowable material has attained the predetermined level; and means for terminating the flow of material into the container in response to the sensing of the echo of a burst of ultrasonic energy at the predetermined delay.

7. Apparatus in accordance with claim 6 in which the means for directing bursts of ultrasonic energy toward the container directs bursts which are each shorter in duration than the time required for a burst of energy to travel to the material and for an echo thereof to return when the predetermined level of material is reached.

8. Apparatus in accordance with claim 6 in which the means for initiating a flow of material comprises:

means for filling the container at a reduced rate at the start and thereafter gradually increasing the rate to a high rate, whereby splashing and sudsing are substantially reduced.

9. Apparatus in accordance with claim 6 and further comprising:

means for additionally sensing the echo of a burst of ultrasonic energy when another predetermined level of material which is less than the predetermined level is reached; and means for reducing the flow of material into the container in response to the additional sensing of the echo of a burst of ultrasonic energy when the other predetermined level is reached.

10. Apparatus in accordance with claim 6 in which the means for initiating a flow of material initiates two separate flows of material with each being directed toward a different container; and further comprising:

means for sensing the arrival of two containers at a predetermined location for simultaneous filling thereof, the means for initiating the flow of material into each of the containers being responsive to the sensing of the arrival of the two containers.

11. An apparatus for filling containers with flowable material and the like comprising:

a fill station for supporting a container in position to be filled fill tube means at the fill station for filling the container;

fill valve means coupling a source of flowable material to the fill tube, the fill valve means being responsive to a control signal for shutting off flow of material to the fill tube;

timing means for providing first pulses and comparison pulses, each comparison pulse being generated at a predetermined time after each first pulse;

ultrasonic transducer means disposed at the fill station for sensing the level of flowable material in the container, the transducer means being responsive to each first and to each comparison pulse from the timing means to transmit a burst of high frequency ultrasonic energy in response to each pulse, the ultrasonic transducer means receiving the echo of each burst of ultrasonic energy; and comparator means responsive to receipt of echoes from the first and from the comparison bursts for providing a control signal when at least two successive received echoes have the same echo times corresponding to the predetermined echo time of a filled container, whereby the fill valve means is closed in response to the control signal to shut off the flow of material to the fill tube.

12. Apparatus in accordance with claim 11 in which the frequency of the bursts of ultrasonic energy of the transducer is in the range extending upwardly to at least one megahertz and the duration of each burst is at least as long as approximately one cycle of the transmitted ultrasonic energy.

13. Apparatus in accordance with claim 11 in which each burst of ultrasonic energy is approximately one cycle in length.

14. Apparatus in accordance with claim 11 in which the timing means provides synchronizing pulses having varying intervals therebetween, the intervals being greater than the predetermined time.

15. Apparatus in accordance with claim 11 in which the comparator means comprises:
    an electronic gate coupled to the ultrasonic transducer means, the gate having the echoes of the energy bursts as a first input and having a predetermined transit time as a second input.

16. Apparatus in accordance with claim 11 and further comprising:
    means for opening the fill valve means quickly to a partially open position and then gradually to its fully open position.

17. Apparatus in accordance with claim 11 in which there are two fill heads at first and second adjacent fill stations and further comprising:
    conveyor means for advancing containers in series to the fill stations;
    an inlet star wheel mounted on a first shaft in advance of the first fill position and an outlet star wheel mounted on a second shaft downstream of the second fill station;
    a first control switch disposed adjacent to the first shaft and a second control switch disposed adjacent to the second shaft;
    first cam means coupled to the first shaft and second cam means coupled to the second shaft, each cam means being adapted to close the first or second control switches respectively when the shaft related thereto is rotated by movement of two containers past the star wheels;
    first and second brake means on each shaft for preventing rotation of the associated star wheel;
    means responsive to control signals for shutting down flow of material and for releasing the first and second brake means; and
    means responsive to the closing of the first and second switches for enabling the opening of the fill valve means.

18. A method for filling a container or the like with flowable material to a predetermined level using ultrasonic energy comprising the steps of:
    initiating a flow of material into the container;
    directing bursts of ultrasonic energy from a directing means towards the container to be filled, the bursts being spaced apart at intervals;
    sensing an echo at a predetermined delay with respect to a burst of ultrasonic energy when the predetermined level is reached;
    terminating the flow of material into the container in response to the sensing of the echo of a burst of ultrasonic energy at the predetermined delay; and
    selecting the interval of time between successive bursts to provide a predetermined interval between a first and a second burst and another but different predetermined interval between a second and a third burst, each of the predetermined interval and the other predetermined interval being longer than the time required for a burst to travel to the surface of the flowable material at the predetermined level and the echo to return back;
    in which the step of sensing comprises sensing that at least two successive echoes have been received which have the same delay time as that required for sound to travel from the directing means to the surface of the material when at the predetermined level and back.

19. A method for filling a container or the like with flowable material to a predetermined level using ultrasonic energy comprising the steps of:
    initiating a flow of material into the container;
    directing bursts of ultrasonic energy toward the container to be filled, the bursts being spaced apart at intervals;
    sensing an echo at a predetermined delay with respect to a burst of ultrasonic energy when the predetermined level is reached;
    terminating the flow of material into the container in response to the sensing of the echo of a burst of ultrasonic energy at the predetermined delay; and
    directing a jet of gaseous fluid against the surface of the material being flowed into the container to displace bubbles, foam and the like on the surface of the material in the container to insure that a true surface is presented to the bursts of ultrasonic energy.

20. Apparatus for filling a container or the like with flowable material to a predetermined level using ultrasonic energy comprising:
    means for initiating a flow of material into the container;
    means for directing bursts of ultrasonic energy toward the container to be filled, the bursts being spaced apart at intervals;
    means for sensing an echo at a predetermined delay with respect to a burst of ultrasonic energy when the predetermined level is reached;
    means for terminating the flow of material into the container in response to the sensing of the echo of a burst of ultrasonic energy at the predetermined delay; and
    means for selecting the interval of time between successive bursts to provide a predetermined interval between a first and a second burst and another but different predetermined interval between a second and a third burst, each of the predetermined interval and the other predetermined interval being longer than the time required for a burst to travel to the surface of the flowable material at the predetermined level and the echo to return back; and
    in which the means for sensing comprises means for detecting that at least two successive echoes have been received which have the same delay time as that required for sound to travel from the directing means to the surface of the material and back when at the predetermined level.

21. Apparatus for filling a container or the like with flowable material to a predetermined level using ultrasonic energy comprising:
    means for initiating a flow of material into the container;

means for directing bursts of ultrasonic energy toward the container to be filled, the bursts being spaced apart at intervals;

means for sensing an echo at a predetermined delay with respect to a burst of ultrasonic energy when the predetermined level is reached;

means for terminating the flow of material into the container in response to the sensing of the echo of a burst of ultrasonic energy at the predetermined delay; and means for directing a jet of gaseous fluid against the surface of the material being flowed into the container to displace bubbles, foam and the like on the surface of the material in the container to insure that a true surface is presented to the bursts of ultrasonic energy.

22. An apparatus for filling containers with flowable material and the like comprising:

fill station means for supporting a container in position to be filled;

fill tube means at the fill station means for filling the container;

fill valve means coupling a source of flowable material to the fill tube means, the fill valve means being responsive to a control signal for shutting off flow of material to the fill tube means;

timing means for providing first pulses and comparison pulses, each comparison pulse being generated at a predetermined time after a first pulse;

ultrasonic transducer means disposed at the fill station for sensing the level of flowable material in the container, the transducer means being responsive to each first and to each comparison pulse from the timing means to transmit a burst of high frequency ultrasonic energy, the ultrasonic transducer means receiving the echo of each burst of ultrasonic energy;

comparator means responsive to the received bursts for providing a control signal when at least two successive received bursts each have a first predetermined echo time corresponding to the echo time of a filled container, whereby the fill valve means is closed in response to the control signal to shut off the flow of material to the fill tube;

a second comparator means for determining when the arrival times of successive received bursts each have a second predetermined echo time corresponding to the echo time of a partially filled container; and means responsive to the determination that two successive received pulses which have the second predetermined time have been received for transmitting a throttle control signal to the fill valve means to partially close the fill valve means.

23. An apparatus for filling containers with flowable material and the like comprising:

fill station means for supporting a container in position to be filled;

fill tube means at the fill station means for filling the container;

fill valve means coupling a source of flowable material to the fill tube means, the fill valve means being responsive to a control signal for shutting off flow of material to the fill tube means;

timing means for providing synchonizing pulses and comparison pulses, each comparison pulse being provided at a predetermined time after a synchronizing pulse;

ultrasonic transducer means disposed at the fill station for sensing the level of flowable material in the container the transducer means being responsive to each synchronizing pulse and to each comparison pulse from the timing means to transmit a burst of high frequency ultrasonic energy in response to each pulse, the ultrasonic transducer means receiving the echo of each burst of ultrasonic energy;

comparator means responsive to receipt of echoes of the synchronizing bursts and the comparison bursts for providing a control signal when at least two successive received echoes have the same echo times corresponding to the echo time of a filled container, the comparator means including signal storage means coupled to the ultrasonic transducer means for receiving the echo of each burst; and means coupled to the comparator means for testing the stored signals and transmitting the control signal to the fill valve means to at least partially close it.

* * * * *

UNITED STATES PATENT AND TRADEMARK OFFICE
CERTIFICATE OF CORRECTION

PATENT NO. : 4,437,497
DATED : March 20, 1984
INVENTOR(S) : Frederick A. Enander It is certified that error appears in the above-identified patent and that said Letters Patent are hereby corrected as shown below:

Column 4, line 26, delete "relation" and insert --relationship in--

Column 4, line 30, delete "cyliner" and insert --cylinder--

Signed and Sealed this

Nineteenth Day of June 1984

[SEAL]

Attest:

Attesting Officer

GERALD J. MOSSINGHOFF

Commissioner of Patents and Trademarks